United States Patent
Hyppänen et al.

(10) Patent No.: US 7,240,639 B2
(45) Date of Patent: Jul. 10, 2007

(54) METHOD OF AND AN APPARATUS FOR RECOVERING HEAT IN A FLUIDIZED BED REACTOR

(75) Inventors: Timo Hyppänen, Karhula (FI); Kari V. O. Kauppinen, Varkaus (FI); Pekka Lehtonen, Karhula (FI); Harri Vilokki, Kyminlinna (FI); Kimmo Väliaho, Varkaus (FI)

(73) Assignee: Foster Wheeler Energia Oy, Helsinki (FI)

( * ) Notice: Subject to any disclaimer, the term of this patent is extended or adjusted under 35 U.S.C. 154(b) by 0 days.

(21) Appl. No.: 10/552,999

(22) PCT Filed: Apr. 14, 2004

(86) PCT No.: PCT/FI2004/000231

§ 371 (c)(1),
(2), (4) Date: Jun. 26, 2006

(87) PCT Pub. No.: WO2004/091768

PCT Pub. Date: Oct. 28, 2004

(65) Prior Publication Data

US 2007/0022924 A1    Feb. 1, 2007

(30) Foreign Application Priority Data

Apr. 15, 2003  (FI)  ................... 20030574

(51) Int. Cl.
*F28D 13/00* (2006.01)
(52) U.S. Cl. .................. 122/4 D; 165/104.16
(58) Field of Classification Search .......... 122/4 D; 110/216, 245; 165/104.16, 104.18
See application file for complete search history.

(56) References Cited

U.S. PATENT DOCUMENTS 3,921,590 A    11/1975    Mitchell et al. ............ 122/4 D (Continued)

FOREIGN PATENT DOCUMENTS

WO    WO 00/20818 A1    4/2000

(Continued)

OTHER PUBLICATIONS

International Search Report dated Sep. 6, 2004, which was mailed in a Communication dated Sep. 15, 2004, and which issued in corresponding International Application No. PCT/FI2004/000231.

(Continued)

*Primary Examiner*—Gregory Wilson
(74) *Attorney, Agent, or Firm*—Fitzpatrick, Cella, Harper & Scinto

(57) ABSTRACT

A fluidized bed reactor, comprising a furnace, a heat exchange chamber, a substantially vertical discharge channel connected to the lower part of the heat exchange chamber for removing particulate material from the heat exchange chamber to the furnace, and a substantially vertical auxiliary channel for transferring particulate material from the heat exchange chamber to the furnace and from the furnace to the heat exchange chamber, the lower part of said auxiliary channel being provided with nozzles for fluidizing gas and with a flow conduit for connecting said auxiliary channel to the furnace and a flow conduit in the upper part for connecting said auxiliary channel to said heat exchange chamber. The furnace, heat exchange chamber, discharge channel and auxiliary channel preferably form an integrated structure having the discharge channel and the auxiliary channel adjacently arranged between the furnace and the heat exchange chamber.

23 Claims, 5 Drawing Sheets

U.S. PATENT DOCUMENTS

Figure 1:
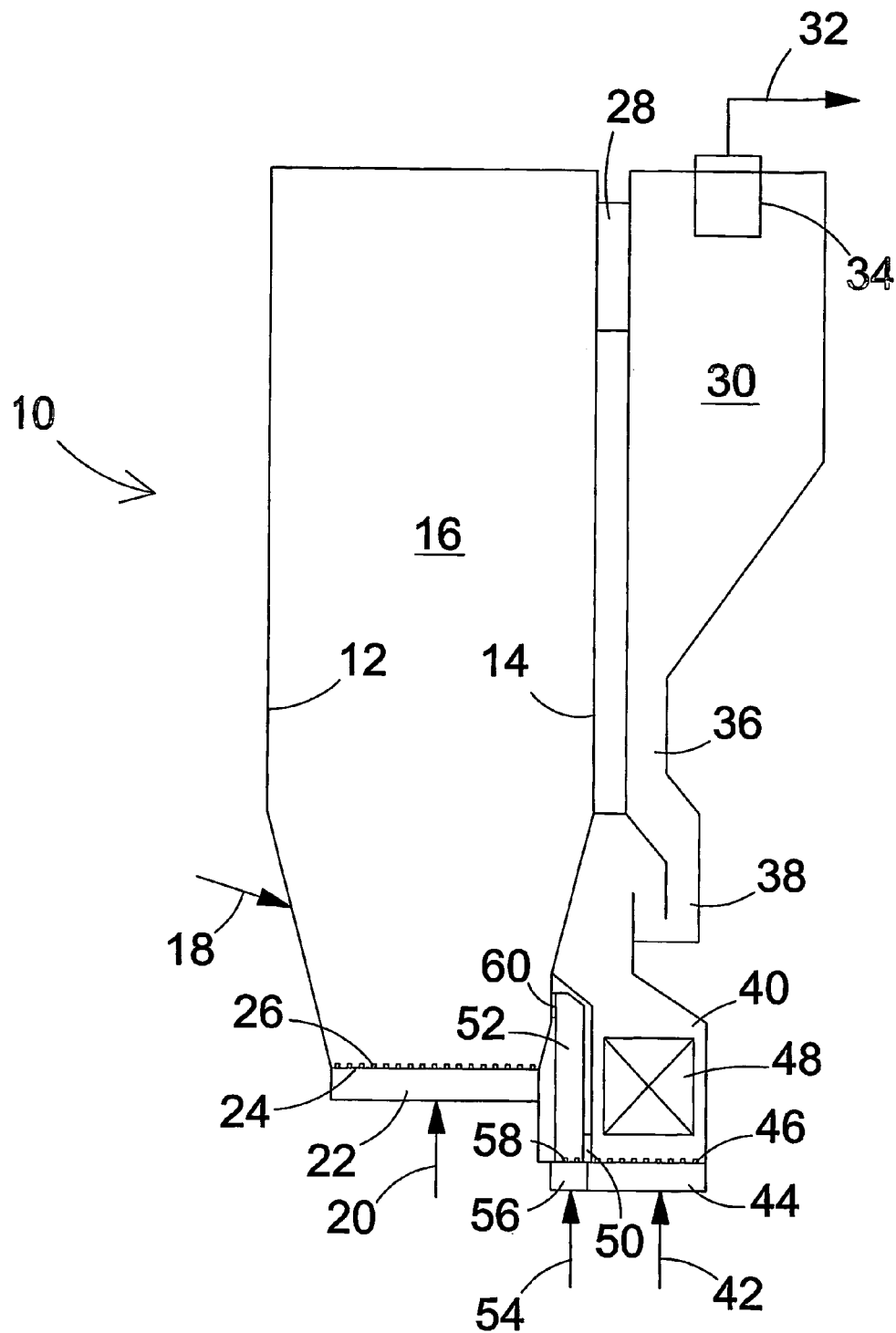

| | | | | |
|---|---|---|---|---|
| 4,925,632 | A | | 5/1990 | Thacker et al. ............. 422/142 |
| 5,025,350 | A | | 6/1991 | Tienken ........................ 362/61 |
| 5,239,946 | A | * | 8/1993 | Garcia-Mallol ............ 122/4 D |
| 5,526,775 | A | * | 6/1996 | Hyppanen .............. 122/235.11 |
| 5,533,471 | A | * | 7/1996 | Hyppanen ................. 122/4 D |
| 5,540,894 | A | | 7/1996 | Hyppanen ................... 422/146 |
| 5,682,828 | A | * | 11/1997 | Phalen et al. ................ 110/245 |
| 5,735,682 | A | * | 4/1998 | Toth ........................... 431/170 |
| 6,237,541 | B1 | * | 5/2001 | Alliston et al. ............ 122/4 D |
| 6,336,500 | B2 | | 1/2002 | Hyppanen .................... 165/96 |
| 6,631,698 | B1 | * | 10/2003 | Hyppanen et al. .......... 122/4 D |
| 2006/0000425 | A1 | * | 1/2006 | Kokko ...................... 122/4 D |

FOREIGN PATENT DOCUMENTS

| | | |
|---|---|---|
| WO | WO 01/73343 A1 | 10/2001 |

OTHER PUBLICATIONS

International Preliminary Report on Patentability mailed Sep. 12, 2005, issued in International Application No. PCT/FI2004/000231.
Written Opinion of the International Searching Authority mailed Sep. 15, 2004, issued in International Application No. PCT/FI2004/000231.

* cited by examiner

METHOD OF AND AN APPARATUS FOR RECOVERING HEAT IN A FLUIDIZED BED REACTOR

The present invention relates to a method of and an apparatus for recovering heat in a fluidized bed reactor. The present invention especially relates to a method of and an apparatus for transferring particulate material between a heat exchange chamber and a furnace of a fluidized bed reactor.

The fluidized bed reactor of the present invention comprises a furnace having a bed of particulate material and a bottom limiting the furnace from below and comprising nozzles for fluidizing gas; a heat exchange chamber provided with heat exchange surfaces for recovering heat from particulate material; and a discharge channel connected to the lower part of the heat exchange chamber for discharge of particulate material from the heat exchange chamber to the furnace.

It is commonly known to provide a fluidized bed reactor with a heat exchange chamber, in which heat is recovered from a particulate bed material to a heat exchange medium. The heat exchange chamber is often connected to the hot circulation of a circulating fluidized bed reactor, whereby the heat exchange chamber receives hot bed material from the separator of the hot circulation. The heat exchange chamber may, however, also be a separate unit, which receives the hot material directly from the furnace of the reactor.

When operating a fluidized bed reactor of a circulating fluidized bed type with a high efficiency, in other words at a high load, fluidizing gas is fed through the grate of the furnace at a high velocity, and a lot of particulate material is entrained with the gas being discharged from the reactor. When the hot bed material separated from the discharge gas by a particle separator is guided to the heat exchange chamber, a sufficient amount of material to be cooled is usually received at high loads to the heat exchange chamber. It is, however, possible that in certain conditions, especially at low loads of the reactor, the particle flow from the separator is not sufficient to achieve the required heat exchange efficiency. In such a case, it is necessary to increase the flow of hot material to the heat exchange chamber by feeding additional bed material directly from the furnace.

It is also possible that, especially at high loads, the particle flow from the hot circulation is greater than what is required in the heat exchange chamber for achieving a desired heat transfer efficiency. It may thereby be advantageous to feed a portion of the material from the hot circulation back to the furnace without it flowing through the heat exchange surfaces of the heat exchange chamber.

U.S. Pat. No. 5,526,775 illustrates a heat exchange chamber integrated with a circulating fluidized bed reactor and being connected to the hot circulation of the reactor. Hot bed material is transferred to the upper part of the heat exchange chamber from the particle separator and cooled material is lifted from the lower part of the heat exchange chamber to the furnace along a vertical discharge channel. The common wall between the furnace and the heat exchange chamber at the upper part of the heat exchange chamber is provided with openings, through which hot bed material is received to the heat exchange chamber also directly from the furnace. Through these openings, it is also possible to discharge uncooled material as an overflow when the volume of the hot circulation flow is higher than what is required to achieve a desired heat exchange efficiency.

The amount of the material transferring to the heat exchange chamber through the openings in the wall of the construction illustrated in U.S. Pat. No. 5,526,775 cannot be adjusted independently. The openings are located in the reactor wall at a region, where the average bed density is not very high. Thus, it is possible that at low loads the amount of hot material flowing to the heat exchange chamber through the openings is not sufficient, if the area of the openings is not relatively large. Another problem is that with an overflow situation, it is in some cases difficult to control the ratio of the material flows flowing through the overflow openings and the discharge channel, and thus also the heat exchange efficiency.

U.S. Pat. No. 4,947,804 illustrates a heat exchange chamber connected directly to a furnace. Material from the furnace is transferred to the heat exchange chamber through a slightly sloping fluidized feed pipe. The feed pipe is connected to the lower part of the heat exchange chamber in a high density bed region, whereby the amount of the entrained material may in some cases remain too small. In this arrangement, possible large particles in the furnace, which may either be entrained with the fuel or formed only in the furnace, may also cause problems. This kind of large particles may decrease the heat exchange efficiency of the heat exchange chamber by clogging the feed pipe or the spaces between the heat exchange surfaces.

U.S. Pat. No. 5,540,894 illustrates a process chamber, to which material is transferred from the furnace through an vertical lifting channel. Material is discharged from the process chamber through separate openings from the upper part of the chamber or through so called gill openings at the center part of the process chamber. The problem with this chamber is that the material to be discharged may be insufficiently processed.

U.S. Pat. No. 4,896,717 illustrates a heat exchange chamber, in which material is fed from the separator of the hot circulation to the lower part thereof and in which cooled material is discharged from the upper part thereof to the furnace as an overflow along a vertical channel. This construction does not allow independent adjusting of the amount of material to be fed in.

The purpose of the present invention is to provide a method and an apparatus, in which the above mentioned problems of the prior art have been minimized.

More specifically, the purpose of the present invention is to provide a fluidized bed reactor and a method of operating a fluidized bed reactor, where the heat exchange efficiency may efficiently be adjusted at all kind of loads.

A purpose of this invention is especially to provide a fluidized bed reactor and a method of operating a fluidized bed reactor, where a sufficient and accurately adjustable material flow is provided to the heat exchange chamber at all load conditions of the reactor.

To achieve these objectives a fluidized bed reactor and a method of operating a fluidized bed reactor are provided, the characterizing features of which are disclosed in the characterizing part of the independent apparatus claim and in the independent method claim.

Thus, a characterizing feature of the circulating fluidized bed reactor in accordance with the present invention is that the fluidized bed reactor comprises a substantially vertical auxiliary channel for transferring particulate material from the heat exchange chamber to the furnace and from the furnace to the heat exchange chamber, the lower part of the auxiliary channel being provided with nozzles for fluidizing gas and with a flow conduit for connecting the auxiliary channel to the furnace, and the upper part of the auxiliary channel being provided with a flow conduit for connecting the auxiliary channel to the heat exchange chamber.

The heat exchange chamber in accordance with the present invention can preferably be connected to the hot circulation of the circulating fluidized bed reactor, but it may also be connected directly to the furnace of the fluidized bed reactor, for example, a bubbling fluidized bed reactor.

The discharge channel of the heat exchange chamber is preferably connected to the heat exchange chamber below the heat exchange surfaces therein and the auxiliary channel above the heat exchange surfaces, respectively. By means of these channels either cooled material from the lower part of the chamber or uncooled material from the upper part of the chamber can be transferred from the heat exchange chamber to the furnace.

According to a preferred embodiment of the present invention, the discharge channel is substantially vertical, the lower part of the discharge channel is provided with nozzles for fluidizing gas and the lower part of discharge channel is provided with a flow conduit for connecting the heat exchange chamber to a discharge channel and the upper part is provided with a flow conduit to connect the discharge channel to the furnace. Thus, there is preferably at least two substantially vertical channels between the heat exchange chamber and the furnace: a discharge channel connected to the lower part of the heat exchange chamber and an auxiliary channel connected to the upper part of the heat exchange chamber.

Material to be discharged from the lower part of the heat exchange chamber is preferably fluidized in a vertical discharge channel in such a way that the material rises upwards in the channel, whereafter it is led through a flow conduit in the upper part of the discharge channel to the furnace. Correspondingly, uncooled material may be discharged from the upper part of the chamber as an overflow along a second substantially vertical channel downwards, whereafter it is led through a flow conduit in the lower part of the auxiliary channel to the furnace. By adjusting the amount of the material to be discharged from the lower part of the heat exchange chamber through the discharge channel, it is possible to efficiently adjust the heat exchange efficiency of the heat exchange chamber.

A special feature of the present invention is that the auxiliary channel connected to the upper part of the heat exchange chamber may be used for the discharge of excess uncooled material as an overflow from the upper part of the heat exchange chamber or, alternatively, for feeding hot bed material to the heat exchange chamber. Typically, the auxiliary channel is used as an overflow channel at high loads and as a feed channel for auxiliary material at low loads.

Typically, a large number of devices required by different operations must be fit in a limited space in the lower part of the fluidized bed reactor. There are usually three different kinds of solid flows between the furnace and the heat exchange chamber: a flow of cooled solids from the lower part of the heat exchange chamber to the furnace, a flow of uncooled solids from the upper part of the heat exchange chamber to the furnace and a flow of hot solids to the heat exchange chamber. In different operational situations of the fluidized bed reactor the flow volumes of these different material flows may be considerably large, which is why each flow requires a flow channel with a sufficient size. According to the present invention, material is transferred along the same flow channel in different operational situations either from the furnace to the heat exchange chamber or from the heat exchange chamber to the furnace. Thus, by utilizing such an arrangement the space need for the flow channels for solids is minimized, which again makes it easier to set different operations to the lower part of the furnace.

According to the present invention, the lower part of the auxiliary channel is provided with nozzles for fluidizing gas. By altering the flow velocity of the gas flowing through said nozzles, it is possible to adjust the flow velocity and the flow direction of the material flowing in the auxiliary channel. If the flow velocity of the fluidizing gas is low, no material flows upwards in the channel, from the flow conduit of the lower part to the flow conduit of the upper part, but the channel serves only as an overflow channel for the discharge of the material from the heat exchange chamber. When the velocity of the fluidizing gas exceeds a certain limit speed, which also with fine materials is typically clearly over 1 m/s, hot bed material begins to flow from the furnace to the heat exchange chamber.

When the velocity of the fluidizing gas is raised, the amount of the hot bed material flowing to the heat exchange chamber increases and at the same time the heat exchange efficiency in the heat exchange chamber is enhanced. Thus the auxiliary channel in accordance with the invention deviates operationally from the flow opening known as an overflow passage in that the auxiliary channel also operates as an inlet channel which is adjusted independently from the rest of the operation of the reactor.

A fluidized bed reactor in accordance with the present invention is preferably arranged in such a way that a furnace, a heat exchange chamber, a dicharge channel and an auxiliary channel form a uniform structure, in which the discharge channel and the auxiliary channel are arranged adjacently between the furnace and the heat exchange chamber. The discharge channel and the auxiliary channel preferably are arranged to the wall between the heat exchange chamber and the furnace adjacently in such a way that they are at least partially at the same height level. At least part of the walls of the furnace and the heat exchange chamber integrated therein are preferably formed of water tubes connected to each other by so called fins, which may at least partially be refractory-lined.

When the heat exchange chamber and the discharge channel are fluidized homogeneously and with a uniform speed, the levels of the fluidized beds therein are in equilibrium approximately at a same height level. If the fluidizing velocities in the heat exchange chamber and in the discharge channel deviate from each other, the bed density is in a region with more fluidization lower than in a region with less fluidization. Respectively, the height of the bed is in equilibrium higher in a region with more fluidization than in a region with less fluidization.

The flow of material through the discharge channel causes friction, which is why the pressure for generating the flowing has to be to a certain extent higher at the bottom of the heat exchange chamber than at the bottom of the discharge channel. This is why in the flow situation the height of the bed may be at a higher level in the heat exchange chamber than in the discharge channel.

It has been noted in practice that in the arrangement illustrated in U.S. Pat. No. 5,526,775 when operating at high loads, the adjustment of the material flow flowing through the discharge channel by altering the fluidizing velocity of the discharge channel is in some conditions difficult. At very low velocities of the fluidizing gas in the discharge channel, the flow of the material in the discharge channel stops, whereby all material exits as an overflow through the openings in the upper part of the chamber, and the heat exchange efficiency of the chamber remains very low. A surprising feature that has been noted is that when the fluidizing velocity of the discharge channel is raised in such a way that the material begins to flow in the discharge channel, the material layer accumulating in the heat exchange chamber may in some situations immediately begin to push all the hot material entering the chamber through the discharge channel. Thereby, the heat exchange efficiency of the heat exchange chamber quickly rises to a high value, and the desired accurate adjustability of heat exchange efficiency is not achieved.

A natural solution to the above described problem is to add friction caused by the discharge channel, for example, by diminishing the width of the channel. The problem with this arrangement is that a narrow channel has a high risk of clogging, for example, due to random large pieces or accumulations forming in the channel. It has now been noted that the adjustability of the heat exchange efficiency in the heat exchange chamber may be improved by maintaining the height difference between the lower edges of the higher flow conduit of the overflow channel and the higher flow conduit of the discharge channel small enough. Thereby, the height of the bed material layer accumulating in the heat exchange chamber never rises to such a level that it forces all material to flow through the discharge channel.

According to a preferred embodiment of the present invention, the flow conduit in the upper part of the auxiliary channel is at most at an approximately 500 mm, most preferably at most about 300 mm, higher level than the flow conduit in the upper part of the discharge channel. In some situations, for example, when the movability of the bed material is especially good, it may be necessary to fit the flow conduit in the upper part of the auxiliary channel to the same or even to a lower height level than the flow conduit in the upper part of the discharge channel.

The arrangement of the flow conduits in the upper part of the channels in the manner described above provides that by altering the fluidizing velocity of the discharge channel, it is possible to adjust a desired portion of the material to flow through the heat exchange chamber and to exit through the discharge channel from the bottom of the heat exchange chamber. The rest of the hot material exits as an overflow through the auxiliary channel directly to the furnace and is not allowed to contact the heat exchange surfaces. Thus, by changing the amount of the portion exiting through the discharge channel it is possible to efficiently adjust the heat exchange efficiency of the heat exchange chamber.

According to the preferred embodiment of the present invention, material is transferred to the heat exchange chamber in addition to the auxiliary channel also through first inlet means. When the heat exchange chamber is connected to the circulating fluidized bed boiler, the first inlet means preferably comprise a return pipe leading from the separator of the hot circulation to the heat exchange chamber. When the heat exchange chamber is connected to the furnace of the circulating fluidized bed boiler, the first feed means preferably comprise openings in the wall connecting the heat exchange chamber and the furnace.

It is possible that the majority of the hot material enters the heat exchange chamber through the auxiliary channel in accordance with the invention. Preferably the first feed means are, however, arranged in such a way that the majority of the hot material enters through the first feed means and the auxiliary channel in accordance with the invention is used only if required to adjust the material flow in a manner described above.

According to a preferred embodiment of the present invention, a fluidized bed reactor comprises at least two adjacent discharge channels in such a way that the auxiliary channel in accordance with the invention is arranged between two discharge channels. A large heat exchange chamber may also comprise a number of auxiliary channels in accordance with the invention, which are preferably arranged between the two discharge channels.

The alternating positioning of discharge channels and auxiliary channels enables a compact structure, by means of which the large amount of bed material discharged from the heat exchange chamber may efficiently and evenly be distributed to the furnace. In a large fluidized bed reactor there are preferably a number of heat exchange chambers adjacently arranged. By utilizing a discharge channel arrangement in accordance with the above described in these chambers, it is possible to provide a uniform particle flow between the heat exchange chambers and the furnace.

The volume of the heat exchange chamber must be sufficient to be able to fit in a desired amount of heat exchange surface. An advantageous solution to increase the volume of the chamber is to locate the bottom of the chamber to a height level lower than the grid of the furnace. Thus, the flow conduit in the lower part of the auxiliary channel is preferably at a higher level than the flow conduit in the lower part of the discharge channel.

There may be particles larger than the rest of the bed material on the grid of the furnace, which may disturb the operation of the heat exchange chamber, for example, by clogging inlet channel or spaces between the heat exchange surfaces. The particles larger than the rest of the bed particles may also be coal or particles of some other fuel, which when entering the heat exchange chamber may burn incompletely and increase the carbon monoxide content of the exhaust gas of the reactor. In order to avoid the above mentioned problems it has been proved to be advantageous to position the flow conduit in the lower part of the auxiliary channel to a level higher than the level of the grid of the furnace, preferably to a level at least 200 mm higher than the height level of the grid. A step below the flow conduit prevents harmful large pieces from entering the auxiliary channel or the heat exchange chamber.

The flow conduit in the lower part of the auxiliary channel usually comprises at least a short substantially horizontal channel portion, the bottom of which has nozzles for fluidizing gas. In order to prevent the large pieces on the bottom of the furnace from flowing to the auxiliary channel, it has been noted to be advantageous that the substantially horizontal channel portion is to a certain extent outwards rising from the furnace. The rise inclination of the channel portion is preferably about 10-20 degrees. The nozzles for fluidizing gas arranged to the substantially horizontal channel portion may preferably be nozzles directing fluidizing gas towards the furnace, for example, so called step grid nozzles. By utilizing directing nozzles, the material flow may be directed on the bottom grid away from the flow conduit of the auxiliary channel, which again diminishes the risk of large particles at the bottom of the furnace flowing to the auxiliary channel. When utilizing step grid nozzles, the flow conduit of the auxiliary channel may preferably be at the level of the bottom grid in such a way that the step grid of the substantially horizontal portion of the channel is an extension of the step grid of the bottom of the furnace.

To ensure the flow of the fine material to the heat exchange chamber at the same time when preventing large pieces from entering it, it is possible to advantageously arrange nozzles for fluidizing gas to different height levels in the auxiliary channel. Because the nozzles for fluidizing gas are arranged at different height levels, the flow velocity of the fluidizing gas in the upper part of the auxiliary channel is higher than that of the lower part of the channel. For example, the fluidization velocity in the lower part of the auxiliary channel may be approximately 1 m/s, in the middle part approximately 2 m/s and in the upper part of the channel approximately 3 m/s or even more.

Figure 2:
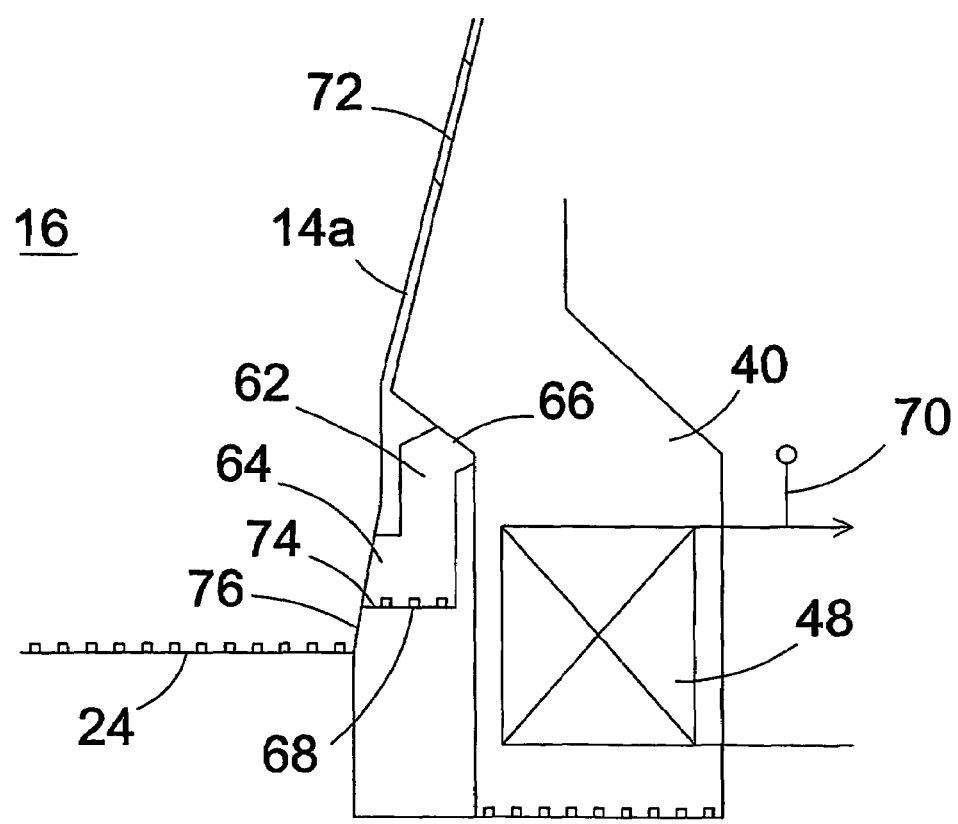
Figure 3:
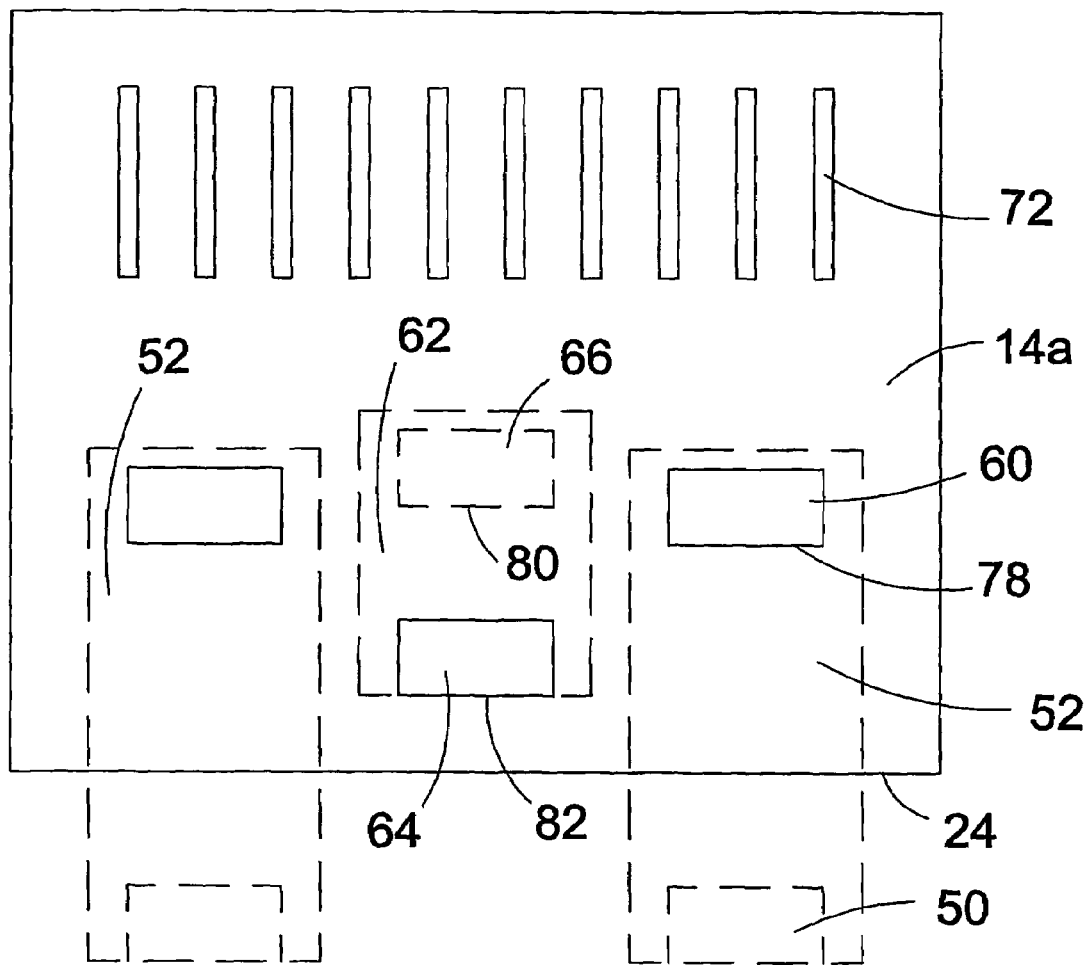
Figure 4:
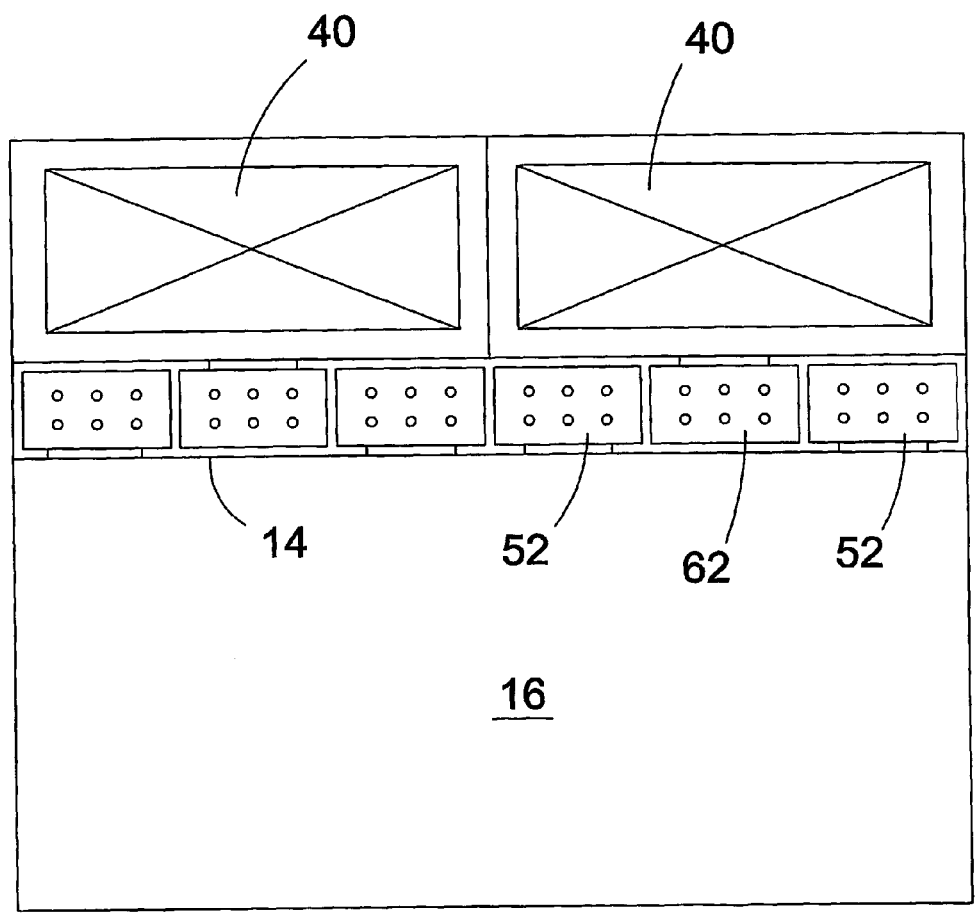
Figure 5:
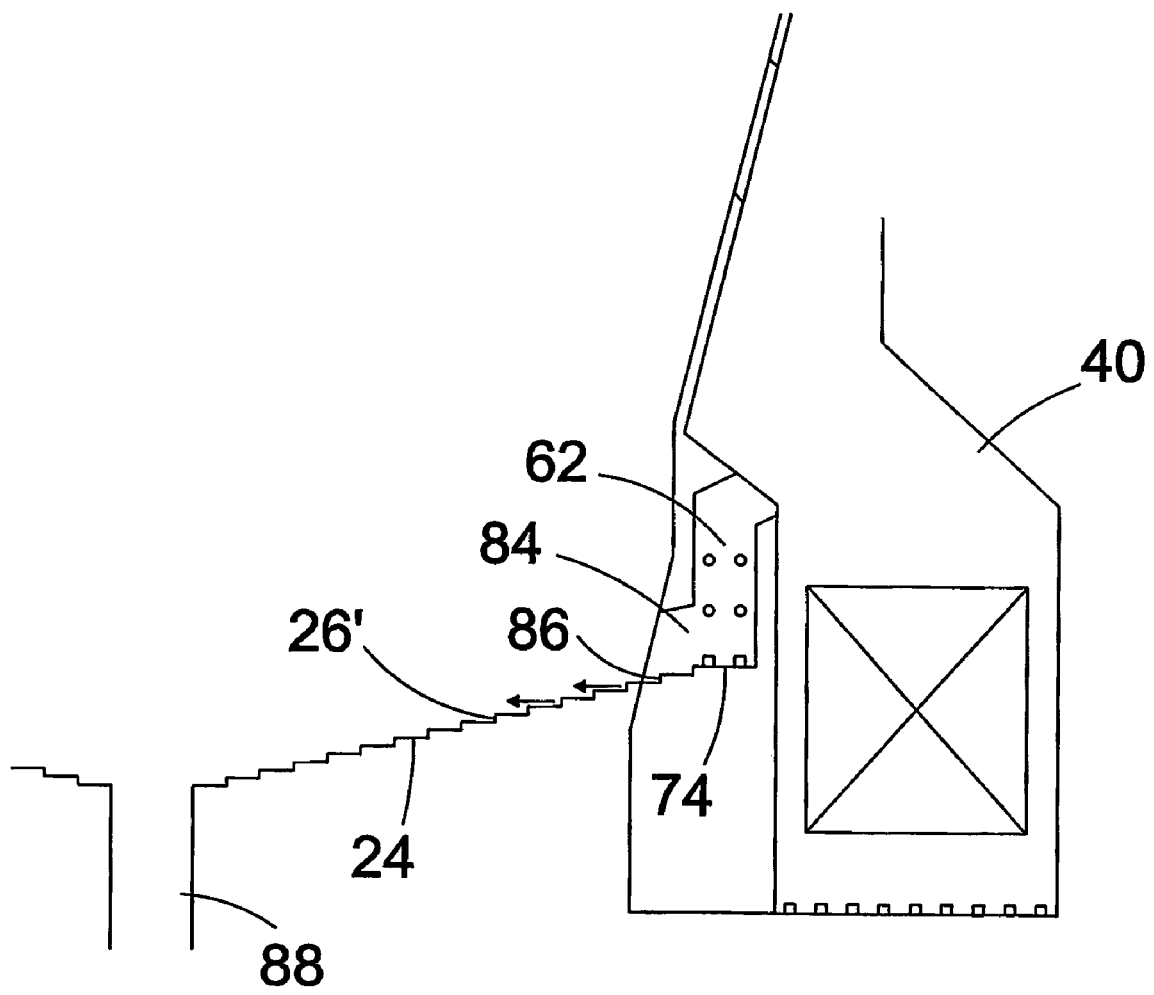

The invention is described more in detail below by way of example, with reference to the accompanying drawings, in which FIG. 1 schematically illustrates a vertical cross-section of a circulating fluidized bed reactor, the hot circulation of which is provided with a heat exchange chamber, FIG. 2 schematically illustrates a vertical cross-section of a heat exchange chamber in accordance with the invention;

FIG. 3 schematically illustrates a front view of a heat exchange chamber in accordance with the invention taken from the direction of the furnace;

FIG. 4 schematically illustrates a horizontal cross-section of a fluidized bed reactor having two heat exchange chambers in accordance with the invention;

FIG. 5 schematically illustrates a vertical cross-section of a second heat exchange chamber in accordance with the present invention.

FIG. 1 is a schematic vertical cross-section of a circulating fluidized bed reactor 10 having a heat exchange chamber 40 in accordance with the present invention. The circulating fluidized bed reactor comprises a furnace 16 defined by water tube walls 12,14, and which furnace again comprises means 18 for feeding fuel, for example coal or biofuel, inert bed material, for example sand, and possible additives, for example limestone. The reactor also comprises means 20 for feeding oxygen-containing fluidizing gas, usually air, at a predetermined velocity through a wind box 22 and nozzles 26 for fluidizing gas positioned at a bottom 24 of the furnace to the lower part of the furnace 16. Typically, the velocity of the fluidizing air in the furnace of the circulating fluidized bed reactor is 3-8 m/s. The furnace usually comprises also secondary air nozzles, which are, however, not illustrated in FIG. 1.

The fuel reacts in the furnace with the oxygen of the fluidizing gas and generates exhaust gases, which rise to the upper part of the furnace and bed material is entrained therewith. The exhaust gases and the particulate material entrained therewith exit to a particle separator 30 through a conduit 28 arranged in the upper part of the furnace. The majority of the particulate material in the particle separator is separated from the flue gases, and the cleaned gases 32 are discharged through a discharge pipe 34 to a convection section, not shown in FIG. 1, and further through a stack to the environment. The particulate material separated in the particle separator 30 is led to the heat exchange chamber 40 through a return duct 36 and a gas seal 38 in the lower part thereof.

A bed of returned hot particulate material is formed in the heat exchange chamber 40. The heat exchange chamber 40 comprises means 42 for feeding fluidizing gas to the chamber at a predetermined velocity through a wind box 44 and nozzles 46. The velocity of the fluidizing gas in the heat exchange chamber is usually relatively low, typically below 1 m/s. Thus, the bed in the heat exchange chamber is a so called bubbling fluidized bed, which acts very similarly to liquid and which has a well defined upper surface.

The chamber 40 comprises heat exchange surfaces 48, which are utilized to transfer heat from the fluidized hot bed material to a heat exchange medium flowing inside the heat exchange surfaces. By altering the velocity of the fluidizing gas in the heat exchange chamber it is possible to adjust to a certain extent the heat exchange efficiency of the chamber. Generally, the bed surface in the heat exchange chamber is above the heat exchange surfaces, whereby the heat exchange surfaces are inside the fluidized bed.

Cooled particles flow to a substantially vertical discharge channel 52 through an opening 50 in the lower part of the heat exchange chamber 40. The discharge channel 52 is provided with means 54, by means of which it is possible to feed fluidizing gas to the lower part of the channel at a predetermined velocity through a wind box 56 and nozzles 58. The fluidized material rises upwards in the discharge channel 52 and exits back to the furnace 16 through an opening 60 in the upper part of the channel. The velocity of the fluidizing gas in the discharge channel may vary in different operational situations, but in most cases it is approximately the same or slightly higher than the velocity of the fluidizing gas in the heat exchange chamber.

FIG. 2 schematically illustrates a vertical cross-section of a heat exchange chamber in accordance with the present invention, showing a substantially vertical auxiliary channel 62. FIG. 2 may illustrate another section of the heat exchange chamber of the circulating fluidized bed reactor illustrated in FIG. 1 or it may be a section of an independent heat exchange chamber, which is not connected to the hot circulation of a circulating fluidized bed reactor, but is directly connected to the furnace of a reactor, for example to a bubbling fluidized bed reactor. In both cases, preferably two substantially vertical channels connect to the heat exchange chamber 40, a discharge channel 52 in accordance with FIG. 1 and an auxiliary channel 62 in accordance with FIG. 2.

The lower part of the substantially vertical auxiliary channel 62 illustrated in FIG. 2 is provided with a flow conduit 64 to the lower part of the furnace 16 and the upper part thereof is provided with a flow conduit 66 to the upper part of heat exchange chamber 40. The channel is preferably connected to the furnace in a region, where the density of the fluidized bed is high and to the heat exchange chamber at the level of the upper surface of the fluidized bed or above thereof. The bottom of the channel 62 is provided with nozzles 68 for fluidizing gas, through which it is possible to feed fluidizing gas at a predetermined velocity.

When the velocity of the fluidizing gas in the channel 62 is high enough, typically above 1 m/s, hot bed material moves through the channel from the lower part of the furnace 16 to the heat exchange chamber 40. The amount of the moving material may efficiently be adjusted by changing the velocity of the fluidizing gas in the channel 62. The bed material moving through the channel 62 may form the majority of the hot material flow flowing to the heat exchange chamber 40, but preferably the majority of the hot material arrives through some other way, and only the auxiliary material flow required for the adjustment of the heat exchange efficiency of the heat exchange chamber flows through the channel 62.

According to a preferred embodiment, the flow velocity for fluidizing gas in the channel 62, and thus the flow velocity of the auxiliary material moving to the heat exchange chamber 40 along the channel 62, is controlled based on the temperature measured by means 70 of the heat exchange medium exiting from the heat exchange surfaces 48. The flow velocity of the fluidizing gas in the channel 62 may also be adjusted based on the temperature of the heat exchange chamber 40, furnace 16 or the discharge channel 52 or the particulate materials therein.

When the velocity of the fluidizing gas in the channel 62 is less than a certain limit velocity, typically less than 1 m/s, no material moves through the channel 62 from the furnace 16 to the heat exchange chamber 40. Thereby, it is possible that material flows to another direction through the channel, as an overflow from the upper part of the heat exchange chamber 40 to the furnace 16. Overflow takes place, if more material flows via another route to the chamber 40 than can exit via the discharge channel 52. Material may flow to the heat exchange chamber 40 from the separator 30 of the circulating fluidized bed reactor and/or, for example, through openings 72 in a wall part 14a common to the chamber 40 and the furnace 16.

A bottom 74 of the channel 62 in the arrangement of FIG. 2 is arranged to a level to a certain extent higher than the bottom 24 of the furnace 16. A step 76 between these height levels prevents large pieces possibly at the bottom of the furnace from entering the channel 62 or the heat exchange chamber 40. The height of the step 76 is preferably at least about 200 mm.

The heat exchange chamber 40 preferably comprises two adjacent discharge channels 52 and an auxiliary channel 62 arranged at least partially at the same level with the discharge channels. FIG. 3 schematically illustrates a front view of the wall portion 14a common to the furnace and the heat exchange chamber shown from the direction of the furnace. FIG. 3 shows a preferred respective positioning of the flow openings of two discharge channels 52 and of an auxiliary channel 62 arranged therebetween. In FIG. 3 the flow openings opening to the furnace are illustrated by a continuous line, and the flow openings opening to the heat exchange chamber and the flow channels in the wall part 14a are illustrated by a broken line.

In order to be able to efficiently control the material flow through the discharge channels 52 of a heat exchange chamber in an overflow situation, it has been noted to be advantageous that the lower edge 80 of the upper flow opening 66 of the auxiliary channel 62 is not much higher than the lower edge 78 of the upper flow openings 60 of the discharge channels 52. Preferably, the lower edge 80 of the upper flow opening 66 of the auxiliary channel 62 is at most 500 mm higher, most preferably at most 300 mm higher than the lower edge 78 of the upper flow openings 60 of the discharge channels 52.

The lower edge 82 of the lower flow conduit 64 of the auxiliary channel 62 in FIG. 3 is higher, preferably at least 200 mm higher than the level of the furnace bottom 24. In order to maximize the volume of the chamber, the bottom of the heat exchange chamber is preferably lower than the grid of the furnace. Thus, the lower flow conduits 50 of the discharge channels 52 are preferably lower than the lower flow conduit 64 of the auxiliary channel 62. FIG. 3 also shows openings 72 in the upper part of the common wall part 14a, through which openings hot material may flow from the upper parts of the fluidized bed in the furnace to the upper part of the heat exchange chamber.

FIG. 4 illustrates a horizontal cross-section of the fluidized bed reactor, which shows a furnace 16, two heat exchange chambers 40 and at both heat exchange chambers two discharge channels 52 adjacently arranged between the furnace and the heat exchange chamber and an auxiliary channel 62 arranged therebetween. In an arrangement in accordance with FIG. 4, the material to be returned from the heat exchange chamber 40 is evenly divided throughout the width of the wall 14 of the furnace 16 and material can be transferred evenly to the heat exchange chambers 40 from the region of the wall 14.

FIG. 5 illustrates a vertical cross-section at an auxiliary channel 62 of the heat exchange chamber 40 in accordance with a preferred embodiment of the present invention. The arrangement illustrated in FIG. 5 differs from the arrangement of FIG. 2 in that there is no step between the bottom 74 of the auxiliary channel 62 and the bottom 24 of the furnace, but the level of the bottom 24 continues directly to the bottom 74 of the auxiliary channel 62. In the arrangement illustrated in FIG. 5 the bottom of the substantially horizontal lower part 84 is sloping towards the furnace. Typically, the average inclination of the bottom is 10-20 degrees.

The bottom of substantially horizontal lower part 84 of the auxiliary channel 62 is preferably fluidized by means of a step grid 86, which directs fluidizing gas almost horizontally towards the furnace. An inclined bottom and a directed fluidizing gas efficiently prevent the entrance of large particles possibly at the bottom of the furnace to the channel 62. The step grid 86 at the lower part of the auxiliary channel may preferably be a continuation to a step grid 26' of the bottom of the furnace, which directs large pieces towards the discharge channel 88 for material at the center part of the grid.

Fluidizing gas is fed in the arrangement illustrated in FIG. 5 also in the vertically central part of the channel. The fluidizing gas fed to the center part, for example, at two height levels, provides a progressively increasing velocity of the fluidizing gas. Low fluidizing velocity in the lower part prevents large pieces, for example, large fuel pieces, from rising in the channel 62 and high velocity of the upper part ensures that the fine material portion of the hot material rises up to the heat exchange chamber. According to a preferred embodiment, the fluidizing velocity at the lower part of the channel 62 is about 1 m/s, at the center part about 2 m/s and at the upper part about 3 m/s.

The invention is described above in connection with embodiments seen today as the most preferred, but it must be understood that the invention is by no means limited to these, but covers also a number of other arrangements in the scope defined by the patent claims given below.

The invention claimed is:

1. A fluidized bed reactor (10), comprising:
   a furnace (16), having a bed of particulate material and a bottom (24) provided with nozzles (26) for fluidizing gas, said bottom limiting the furnace from the bottom;
   a heat exchange chamber (40) provided with heat exchange surfaces (48) for recovering heat from the particulate material; and
   a discharge channel (52) connected to the lower part of the heat exchange chamber for removing particulate material from the heat exchange chamber (40) to the furnace (16);
   characterized in that
   the fluidized bed reactor (10) comprises a substantially vertical auxiliary channel (62) for transferring particulate material from the heat exchange chamber (40) to the furnace (16) and from the furnace (16) to the heat exchange chamber (40), the lower part of the auxiliary channel (62) being provided with nozzles (68) for fluidizing gas and with a flow conduit (64) for connecting the auxiliary channel to the furnace (16), and the upper part of the auxiliary channel (62) being provided with a flow conduit (66) for connecting the auxiliary channel (62) to the heat exchange chamber (40).

2. Fluidized bed reactor in accordance with claim 1, characterized in that the discharge channel (52) is substantially vertical, the lower part of the discharge channel is provided with nozzles for fluidizing gas (58) and the lower part of the discharge channel is provided with a flow conduit

(50) for connecting the heat exchange chamber (40) to the discharge channel (52) and the upper part with a flow conduit (60) for connecting the discharge channel (52) to the furnace (16).

3. Fluidized bed reactor in accordance with claim 2, characterized in that the furnace (16), the heat exchange chamber (40), the discharge channel (52) and the auxiliary channel (62) form an integrated structure, having the discharge channel (52) and the auxiliary channel (62) adjacently arranged between the furnace (16) and the heat exchange chamber (40).

4. Fluidized bed reactor in accordance with claim 2, characterized in that the reactor (10) comprises two discharge channels (52), and the auxiliary channel (62) is arranged between the two discharge channels.

5. Fluidized bed reactor in accordance with claim 2, characterized in that the discharge channel (52) and the auxiliary channel (62) are at least partially at the same height level.

6. Fluidized bed reactor in accordance with claim 5, characterized in that the flow conduit (66) in the upper part of the auxiliary channel (62) is at most at an about 500 mm higher height level than the flow conduit (60) in the upper part of the discharge channel (52).

7. Fluidized bed reactor in accordance with claim 6, characterized in that the flow conduit (66) in the upper part of the auxiliary channel (62) is at most at an about 300 mm higher height level than the flow conduit (60) in the upper part of the discharge channel (52).

8. Fluidized bed reactor in accordance with claim 2, characterized in that the flow conduit (64) in the lower part of the auxiliary channel (62) is at a higher height level than the flow conduit (50) in the lower part of the discharge channel (52).

9. Fluidized bed reactor in accordance with claim 1, characterized in that the flow conduit (64) in the lower part of the auxiliary channel (62) is at an at least 200 mm higher height level than the bottom (24) of the furnace.

10. Fluidized bed reactor in accordance with claim 1, characterized in that the lower part of the auxiliary channel (62) is at the level of the bottom (24) of the furnace and the flow conduit (64) in the lower part of the auxiliary channel comprises nozzles (86) for fluidizing gas, which nozzles direct fluidizing gas towards the furnace (16).

11. Fluidized bed reactor in accordance with claim 1, characterized in that the flow conduit (64) in the lower part of the auxiliary channel (62) is provided with step grid nozzles (86).

12. Fluidized bed reactor in accordance with claim 1, characterized in that nozzles for fluidizing gas are arranged at different height levels of the auxiliary channel (62).

13. Fluidized bed reactor in accordance with claim 1, characterized in that the reactor comprises means (70) for measuring the temperature of the furnace (16), heat exchange chamber (40) or the discharge channel (52) or of the particulate material in one of them or of the heat exchange medium flown through the heat exchange surfaces (48) arranged in the heat exchange chamber (40), and means for adjusting the flow velocity of the fluidizing gas to be fed to the lower part of the auxiliary channel (62) based on the measured temperature.

14. Fluidized bed reactor in accordance with claim 1, characterized in that the heat exchange chamber (40) comprises first means (72, 30, 36) for feeding particulate material from the fluidized bed reactor to the heat exchange chamber (40).

15. Fluidized bed reactor in accordance with claim 14, characterized in that the furnace (16) and the heat exchange chamber (40) have a common wall part (14a) and the first means for feeding particulate material to the heat exchange chamber (40) comprise at least one opening (72) in the common wall part (14a).

16. Fluidized bed reactor in accordance with claim 14, characterized in that the fluidized bed reactor (10) is a circulating fluidized bed reactor, the upper part of which furnace is provided with a discharge opening (28) for the discharge of exhaust gases and particulates entrained therewith from the furnace (16), and the first means for feeding particulate material to the heat exchange chamber (40) comprise a separator (30) for separating particles from the exhaust gases of the furnace, and a return duct (36) for guiding at least a portion of the separated particles to the heat exchange chamber (40).

17. A method of recovering heat in a fluidized bed reactor (10), said method comprising the steps of:
(a) feeding carbonaceous fuel (18) and oxygenous fluidizing gas (20) to a furnace of the reactor;
(b) feeding hot bed material particles from the furnace (16) to the upper part of a heat exchange chamber (40);
(c) recovering heat from the hot bed material particles in the heat exchange chamber (40), whereby cooled bed material particles are produced;
(d) discharging cooled bed material particles from the lower part of the heat exchange chamber (40);
characterized in that the method comprises a step of:
(e) discharging hot bed material particles in a first operational state of the fluidized bed reactor (10) as an overflow from the upper part of the heat exchange chamber to the furnace downwards along a substantially vertical auxiliary channel (62) and transferring in a second operational state of the fluidized bed reactor (10) hot bed material particles by means of fluidizing gas fed to the lower part of the auxiliary channel (62) from the furnace (16) to the heat exchange chamber (40) upwards along the substantially vertical auxiliary channel (62).

18. Method in accordance with claim 17, characterized in that the amount of hot bed material transferred from the furnace (16) to the heat exchange chamber is adjusted by altering the amount of the fluidizing gas fed to the lower part of the auxiliary channel (62).

19. Method in accordance with claim 18, characterized in that the method comprises a step of:
(f) measuring the temperature of the furnace (16), the heat exchange chamber (40) or the discharge channel (52) or the material in one of them or the temperature of heat exchange medium flown through heat exchange surfaces (48) arranged in the heat exchange chamber, and adjusting the amount of fluidizing gas fed to the lower part of the auxiliary channel in step (e) based on the temperature measured in step (f).

20. Method in accordance with claim 17, characterized in that at high loads of the fluidized bed reactor, hot bed material particles are discharged as an overflow from the upper part of the heat exchange chamber (40) downwards along the substantially vertical auxiliary channel (62) and at low loads of the fluidized bed reactor hot bed material particles are transferred by means of fluidizing gas fed to the lower part of the auxiliary channel (62) from the furnace (16) to the heat exchange chamber upwards along the substantially vertical auxiliary channel (62).

21. Method in accordance with claim 17, characterized in that the fluidized bed reactor (10) is a circulating fluidized bed reactor and step (b) is carried out by feeding particles separated by a separator (30) of the hot circulation of the circulating fluidized bed reactor to the heat exchange chamber (40).

22. Method in accordance with claim 17, characterized in that step (b) takes place by feeding particulate material directly from the furnace (16) to the heat exchange chamber (40) through an opening (72) in the common wall part (14*a*) thereof.

23. Method in accordance with claim 17, characterized in that in the second operational state in step (e) fluidizing gas is fed to the auxiliary channel (62) at more than one height level.

\* \* \* \* \*